US010415418B2

United States Patent
McCaffrey et al.

(10) Patent No.: US 10,415,418 B2
(45) Date of Patent: Sep. 17, 2019

(54) SYSTEM FOR MODULATING TURBINE BLADE TIP CLEARANCE

(71) Applicant: UNITED TECHNOLOGIES CORPORATION, Farmington, CT (US)

(72) Inventors: Michael G. McCaffrey, Windsor, CT (US); Zaffir A. Chaudhry, S. Glastonbury, CT (US); Fanping Sun, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 391 days.

(21) Appl. No.: 15/406,271

(22) Filed: Jan. 13, 2017

(65) Prior Publication Data

US 2019/0010822 A1   Jan. 10, 2019

(51) Int. Cl.
*F01D 11/22* (2006.01)
*F01D 11/18* (2006.01)

(52) U.S. Cl.
CPC ............ *F01D 11/22* (2013.01); *F01D 11/18* (2013.01); *F05D 2240/11* (2013.01); *F05D 2300/505* (2013.01)

(58) Field of Classification Search
CPC .......... F01D 11/00; F01D 11/08; F01D 11/14; F01D 11/16; F01D 11/18; F01D 11/20; F01D 11/22; F01D 11/24; F05D 2300/505; F05D 2240/11
USPC ............................................ 415/173.2, 174.1
See application file for complete search history.

(56) References Cited

U.S. PATENT DOCUMENTS

| 7,448,849 B1* | 11/2008 | Webster ............... F01D 11/005 415/128 |
| 2016/0053629 A1* | 2/2016 | Duguay ................. F01D 11/22 415/1 |
| 2016/0312645 A1 | 10/2016 | Ribarov | |

FOREIGN PATENT DOCUMENTS

| CN | 104314621 | 1/2015 |
| EP | 1467066 | 10/2004 |
| EP | 2549065 | 1/2013 |
| EP | 2570615 | 3/2013 |
| JP | 60111004 | 6/1985 |

OTHER PUBLICATIONS

European Patent Office, European Search Report dated May 28, 2018 in Application No. 17199595.4-1006.

(Continued)

*Primary Examiner* — Richard A Edgar
(74) *Attorney, Agent, or Firm* — Snell & Wilmer, L.L.P.

(57) ABSTRACT

A system for modulating turbine blade tip clearance is provided. The system may comprise an actuation control system having at least one actuator configured to modulate turbine blade tip clearance. Each actuator may comprise a solid-state motion amplification device such as a flextensional actuator. Each actuator may be in operable communication with a blade outer air seal (BOAS) segment or a BOAS mounting block. The actuators may be configured to move the BOAS segment and/or the BOAS mounting block in a radial direction from a first position to a second position to control tip clearance.

16 Claims, 8 Drawing Sheets

(56) References Cited

OTHER PUBLICATIONS

Jonathan Decastro et al: "System-Level Design of a Shape Memory Alloy Actuator for Active Clearance Control in the High-Pressure Turbine", 41st AIAA/ASME/SAE/ASEE Joint Propulsion Conference & Exhibit, Jul. 12, 2005 (Jul. 12, 2005), pp. 1-21 XP055473361, Reston, Virigina.
Jonathan Decastro et al: "Progress on Shape Memory Alloy Actuator Development for Active Clearance Control", 2005 NASA Seal/Secondary Air System Workshop, vol. I, Jan. 10, 2006 (Jan. 10, 2006), pp. 223-227, XP055473240, Cleveland, OH, United States of America.
Database WPI Week 201524 Thomson Scientific, London, GB; AN 2015-18773V XP002780857.
Markus Ahrens: Structural integration of shape memory alloys for turbomachinery applications11 , Proceedings Optical Diagnostics of Living Cells I I, vol. 3674, Jul. 9, 1999 (Jul. 9, 1999), pp. 426-435, XP055473375, US.
European Patent Office, European Search Report dated May 28, 2018 in Application No. 17199528.5-1006.
U.S. Appl. No. 15/406,324, filed Jan. 13, 2017 and entitled System for Modulating Turbine Blade Tip Clearance.
USPTO, Pre-Interview First Office Action dated Apr. 16, 2019 in U.S. Appl. No. 15/406,324.

\* cited by examiner

SYSTEM FOR MODULATING TURBINE BLADE TIP CLEARANCE

STATEMENT REGARDING GOVERNMENT RIGHTS

This disclosure was made with government support under contract No. NNX15AR27A awarded by the National Aeronautics and Space Administration (NASA). The government has certain rights in the disclosure.

FIELD

The present disclosure relates to gas turbine engines, and more specifically, to a system for modulating blade tip clearances between turbine blades and blade outer air seal (BOAS) segments in gas turbine engines.

BACKGROUND

Gas turbine engines typically include a fan section, a compressor section, a combustor section, and a turbine section. The compressor section and/or the turbine section may include rotatable blades and stationary vanes. Blade outer air seals (BOAS) may be mounted within the engine casing, positioned in close proximity to the outermost tips of the rotatable blades. In response to acceleration of the gas turbine engine, the blade tips can expand outward due to increased heat and centrifugal force at a faster rate than the case expands outward. The tip clearance may be kept relatively large to avoid the blade tips rubbing against the BOAS due to the rapid expansion of the blade relative to the BOAS. The efficiency of the hot sections, and the gas turbine engine, may be undesirably affected by having a large tip clearance between the blade tips and the BOAS, such as, for example, due to the hot gas leaking through the larger tip clearance.

SUMMARY

In various embodiments, an actuation control system is disclosed. The actuation control system may comprise an actuator in operable communication with a blade outer air seal (BOAS) mounting block. The actuation control system may also comprise a BOAS segment coupled to the BOAS mounting block, wherein the BOAS mounting block is configured to move from a first position to a second position in response to an actuation from the actuator.

In various embodiments, the actuator may comprise a control wire configured to control the actuation of the actuator. The control wire may comprise a shape memory alloy (SMA) wire configured to contract in response to receiving an electrical current, and wherein the contraction of the SMA wire controls the actuation of the actuator. The actuation control system may also comprise a power supply having a controller, wherein the power supply is configured to transmit the electrical current to the control wire in response to the controller determining a tip clearance actuation event. In various embodiments, the actuator may comprise a control rod coupled at a first rod end to the actuator and at a second rod end to the BOAS mounting block, wherein the control rod is configured to move the BOAS mounting block from the first position to the second position in response to the actuation from the actuator. In various embodiments, the actuation control system may further comprise at least one of a first bias spring coupled to an outer shell of the actuator or a second bias spring coupled to an inner shell of the actuator. In various embodiments, the actuator may be a flextensional actuator.

In various embodiments, a turbine section of a gas turbine engine is disclosed. The turbine section may comprise a turbine blade having a blade tip. The turbine section may comprise a blade outer air seal (BOAS). The turbine section may comprise an actuation control system comprising an actuator coupled to a radially outer surface of a turbine case and configured to modulate a tip clearance between the blade tip and the BOAS.

In various embodiments, the turbine section may further comprise a BOAS mounting block coupled to a radially inner surface of the turbine case and the BOAS, wherein the actuator is configured to move the BOAS mounting block from a first position to a second position to modulate the tip clearance, in response to an actuation from the actuator. In various embodiments, the actuator may be in operable communication with the BOAS and is configured to move the BOAS from a first position to a second position to modulate the tip clearance, in response to the actuation from the actuator. In various embodiments, the actuator may comprise a control wire configured to control the actuation of the actuator. The control wire may comprise a shape memory alloy (SMA) wire configured to contract in response to receiving an electrical current, and wherein the contraction of the SMA wire controls the actuation of the actuator. The turbine section may further comprise a power supply having a controller, wherein the power supply is configured to transmit the electrical current to the control wire in response to the controller determining a tip clearance actuation event. In various embodiments, the turbine section may further comprise a bias spring coupled to at least one of an outer shell of the actuator or an inner shell of the actuator between the inner shell of the actuator and the turbine case. The actuator may be a flextensional actuator.

In various embodiments, an actuation control system is disclosed. The actuation control system may comprise an actuator and a blade outer air seal (BOAS) segment in operable communication with the actuator. The BOAS segment may be configured to move from a first position to a second position in response to an actuation from the actuator.

In various embodiments, the actuator may comprise a control wire having a shape memory alloy (SMA) wire configured to contract in response to receiving an electrical current, wherein the contraction of the SMA wire controls the actuation of the actuator. The actuation control system may further comprise a power supply having a controller, wherein the power supply is configured to transmit the electrical current to the control wire in response to the controller determining a tip clearance actuation event. In various embodiments, the actuator may comprise a control rod coupled at a first rod end to the actuator and at a second rod end to the BOAS segment, wherein the control rod is configured to move the BOAS segment from the first position to the second position in response to the actuation from the actuator. In various embodiments, the actuation control system may further comprise at least one of a first bias spring coupled to an outer shell of the actuator or a second bias spring coupled to an inner shell of the actuator. In various embodiments, the actuator may comprise a flextensional actuator.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
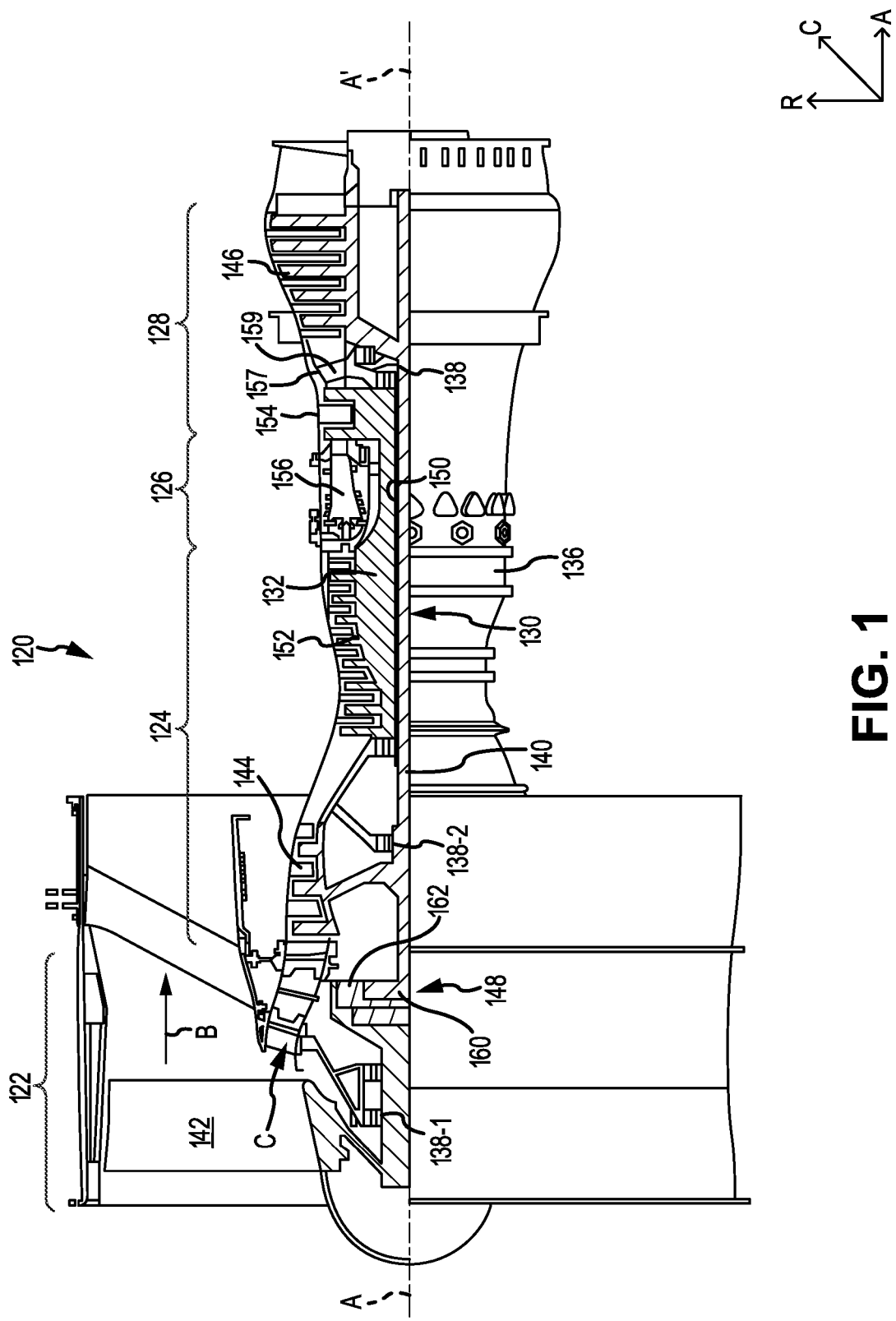
FIG. 1 illustrates a cross-section view of a gas turbine engine, in accordance with various embodiments.

In various embodiments, and with reference to FIG. 1, a gas turbine engine 120 is disclosed. As used herein, "aft" refers to the direction associated with a tail (e.g., the back end) of an aircraft, or generally, to the direction of exhaust of gas turbine engine 120. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

In various embodiments, gas turbine engine 120 may comprise a high-bypass ratio geared aircraft engine. The bypass ratio of gas turbine engine 120 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly larger than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 152 than are conventionally experienced. These higher operating temperatures and pressure ratios create operating environments that cause thermal loads that are higher than the thermal loads conventionally experienced, which may shorten the operational life of current components.

Figure 2A:
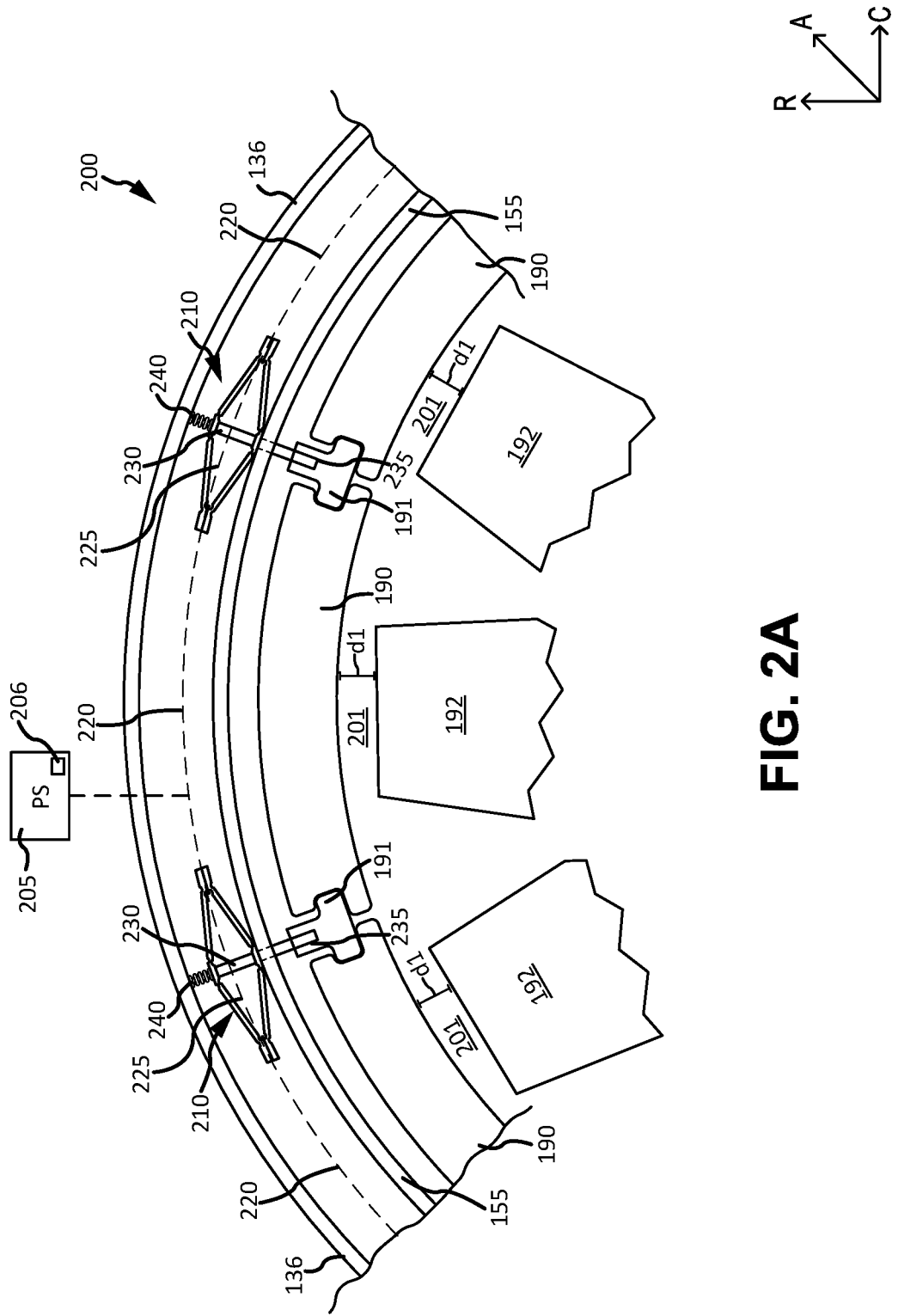
FIG. 2A illustrates a cross-section view of an actuation control system in operable communication with a blade outer air seal (BOAS) mounting block in a first position, in accordance with various embodiments.
Figure 2B:
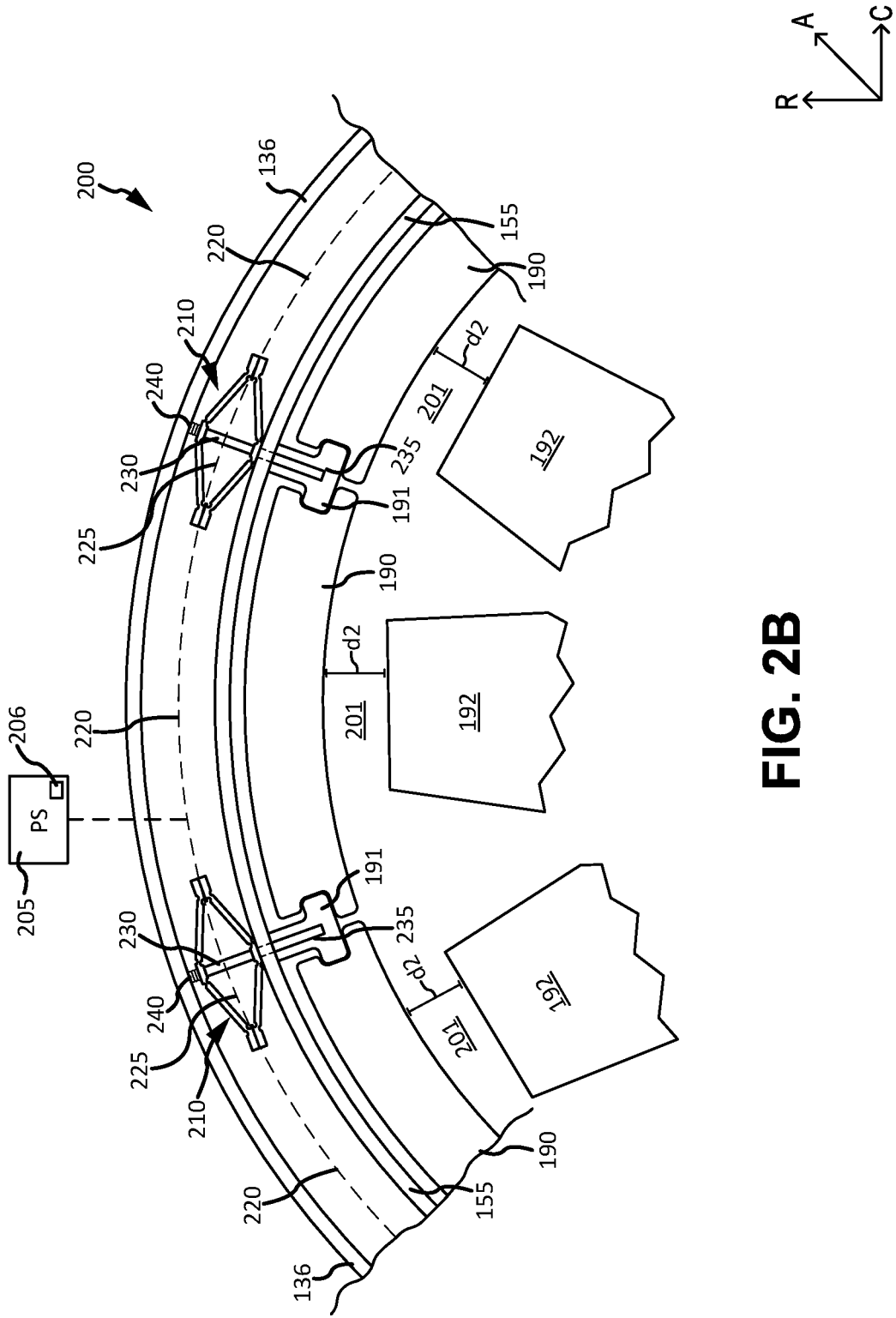
FIG. 2B illustrates a cross-section view of the actuation control system in operable communication with the BOAS mounting block in a second position, in accordance with various embodiments.

In various embodiments, and with reference to FIGS. 2A and 2B, an actuation control system 200 is disclosed. Actuation control system 200 may be located in any suitable location in gas turbine engine 120, such as, for example, in high pressure turbine section 154. Actuation control system 200 may be used to modulate a tip clearance 201 between blade tips 192 of turbine rotors and one or more blade outer air seal (BOAS) segments 190. For example, actuation control system 200 may modulate tip clearance 201 in response to aircraft maneuvers and engine operating parameters (e.g., engine idle, takeoff, cruise, etc.), and/or the like. A smaller tip clearance 201 may enable a more efficient gas turbine engine 120 by decreasing air loss in turbine section 154. Actuation control system 200 may allow for modulation of tip clearances 201 during engine operation, thus enabling smaller tip clearances 201 during higher heat operating cycles while also avoiding rubbing from blade tips 192.

Although actuation control system 200 is depicted as being utilized in high pressure turbine section 154, one skilled in the art will realized that an actuation control system similar to actuation control system 200 may be used in low pressure turbine section 146, high pressure compressor section 152, low pressure compressor section 144, and/or the like, without departing from the scope of the disclosure. Moreover, a similar actuation control system may also be used in a power turbine section of a turboshaft, an intermediate pressure compressor of a three spool gas turbine engine, and/or an intermediate pressure turbine of a three spool gas turbine engine without departing from the scope of the disclosure.

Actuation control system 200 may comprise one or more actuators 210 configured to modulate the tip clearance 201. Each actuator 210 may be independently controlled, controlled in pairs, and/or collectively controlled. Each actuator 210 may be configured to cause a BOAS segment 190 to move in a radially inward or radially outward direction to modulate tip clearance 201. In that respect, each actuator 210 may be configured to move a BOAS segment 190 a distance of about 0.02 inches (0.508 mm) to about 0.05 inches (1.27 mm) (wherein about in this context refers only to +/−0.005 inches (0.127 mm)). For example, each actuator 210 may in operable communication with a BOAS mounting block 191, and may be configured to move BOAS mounting block 191 to cause radial movement in BOAS segment 190 (as described further herein). In that respect, and with brief reference to FIGS. 2A and 2B, each actuator 210 may be coupled to a radially outer surface of turbine case 155 in a position radially outward from each BOAS mounting block 191. With brief reference to FIGS. 5A and 5B, each actuator 210 may also be coupled to a radially inner surface of engine static structure 136 in a position radially outward from each BOAS mounting block 191. As a further example, and with reference to FIGS. 3A and 3B, each actuator 210 may also be in operable communication with each BOAS segment 190, and may be configured to directly cause radial movement in each BOAS segment 190 (as describer further herein). Each actuator 210 may be coupled to the radially outer surface of turbine case 155 in a position radially outward from each BOAS segment 190. Actuator 210 may also be coupled to the radially inner surface of engine static structure 136 in a position radially outward from each BOAS mounting block.

Figure 4A:
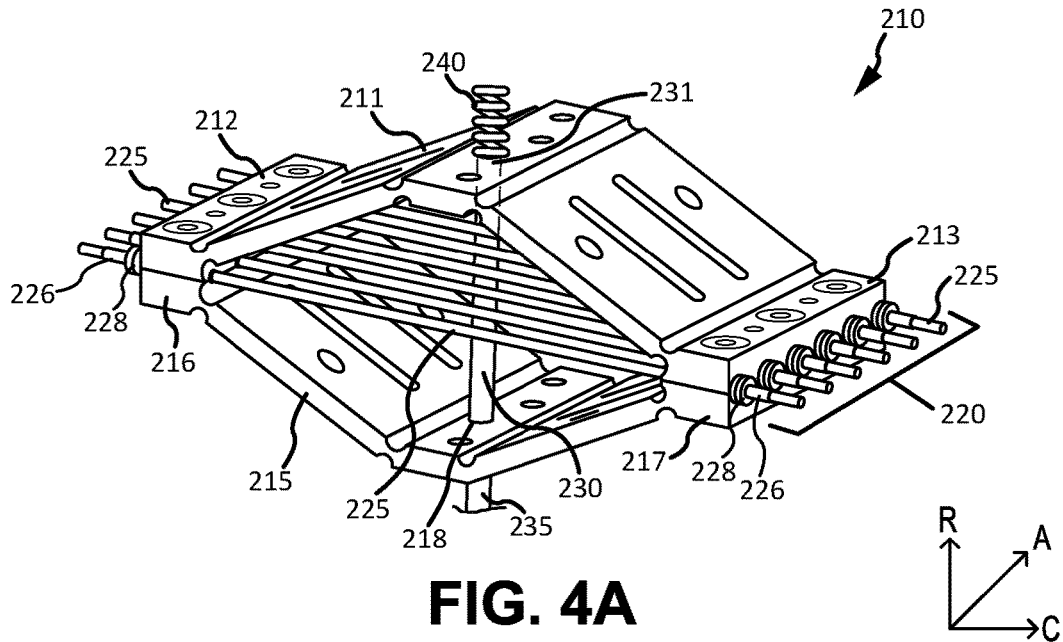
FIG. 4A illustrates an exemplary actuator having a bias spring coupled to an outer shell of the actuator, in accordance with various embodiments.
Figure 4B:
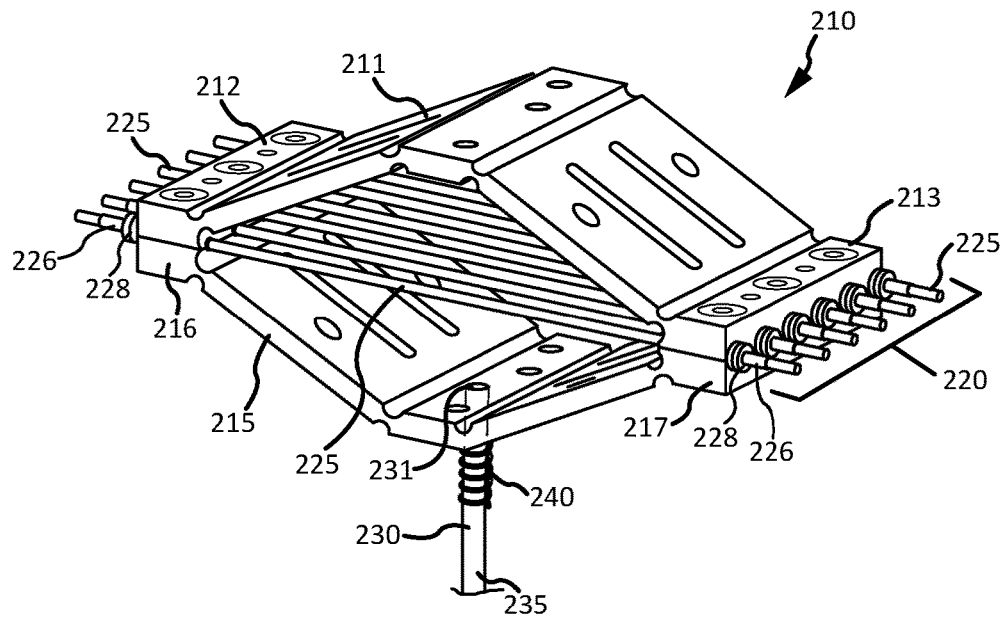
FIG. 4B illustrates an exemplary actuator having a bias spring coupled to an inner shell of the actuator, in accordance with various embodiments.

In various embodiments, and with reference to FIGS. 4A and 4B, actuator 210 is depicted in greater detail. Actuator 210 may comprise any suitable device, actuator, and/or the like capable of receiving an input and generating an output to move a BOAS segment in a radial direction. For example, actuator 210 may comprise a flextensional actuator, a thermal electric actuator, and/or any other suitable solid-state motion amplification device capable of generating a force to move the BOAS segment in a radial direction.

In various embodiments, actuator 210 may comprise an outer shell 211 coupled to an inner shell 215. Outer shell 211 may comprise a first outer shell end 212 circumferentially opposite a second outer shell end 213. Inner shell 215 may comprise a first inner shell end 216 circumferentially opposite a second inner shell end 217. First outer shell end 212 may be coupled to first inner shell end 216. Second outer shell end 213 may be coupled to second inner shell end 217. Inner shell 215 and outer shell 211 may comprise any suitable material capable of allowing actuator 210 to flex in a radial direction, such as, for example, a nickel alloy, titanium, carbon fiber, a nickel chromium alloy (such as that sold under the mark INCONEL, e.g., INCONEL 600, 617, 625, 718, X-70, and the like) and/or any other suitable material.

In various embodiments, actuator 210 may comprise one or more control wires 220. Actuator 210 may comprise any suitable and/or desired number of control wires 220. For example, the number of control wires 220 may be dependent on operational factors, desired actuation force from actuator 210, and/or the like. Control wires 220 may be embedded between the coupling of outer shell 211 and inner shell 215, and may extend in a circumferential direction through actuator 210. Control wires 220 may also be in electronic communication with control wires 220 from each actuator 210 in actuation control system 200, such that all actuators 210 in actuation control system 200 are in electronic communication with each other (e.g., as depicted in FIG. 2A). For example, control wires 220 may be connected in series, in parallel, in interdigital, and/or the like. Control wires 220 may be configured to provide circumferential tension to actuator 210 to control actuation of each actuator 210. In that respect, control wires 220 may comprise a shape memory alloy (SMA) wire 225 configured to contract when heated resistively and return to its original shape when cooled (e.g., by an airflow). SMA wire 225 may comprise a nickel-titanium alloy, and/or any other suitable material.

In various embodiments, control wires 220 may comprise an insulating material 226, such as, for example, a ceramic bushing, and/or the like, configured to cover and insulate SMA wire 225. In that respect, control wires 220 may comprise insulating material 226 between each actuator 210, and SMA wire 225 with no insulating material 226 within each actuator 210 (e.g., between the coupling of first outer shell end 212 and first inner shell end 216 and the coupling of second outer shell end 213 to second inner shell end 217).

In various embodiments, control wires 220 may comprise one or more metal bushings 228 configured to take a circumferential load and control movement of actuator 210 in a circumferential direction. For example, metal bushing 228 may be coupled to control wires 220 forward the coupling of first outer shell end 212 and first inner shell end 216, and a metal bushing 228 may be coupled to control wires 220 aft the coupling of second outer shell end 213 to second inner shell end 217. In that respect, in response to SMA wire 225 contracting when receiving heat, metal bushings 228 may take the circumferential load and cause outer shell 211 to move in a radially outward direction and inner shell 215 to move in a radially inward direction (e.g., the coupling of first outer shell end 212 and first inner shell end 216 and the coupling of second outer shell end 213 to second inner shell end 217 may move in a circumferential direction towards each other, causing outer shell 211 and inner shell 215 to move in a radial direction away from each other). In response to SMA wire 225 cooling, SMA wire 225 may expand, causing the coupling of first outer shell end 212 and first inner shell end 216 and the coupling of second outer shell end 213 to second inner shell end 217 to move in a circumferential direction away from each other, thus causing outer shell 211 and inner shell 215 to move in a radial direction towards each other.

In various embodiments, actuator 210 may comprise a control rod 230 configured to move a BOAS segment in response to actuation from actuator 210. In that respect, control rod 230 may comprise an outer rod end 231 radially opposite an inner rod end 235. With reference to FIG. 4A, outer rod end 231 may be coupled to a radially inner surface of outer shell 211. In that respect, control rod 230 may pass through a control rod aperture 218 (e.g., a through-hole) defined on a radially inner surface of inner shell 215. With reference to FIG. 4B, outer rod end 231 may also be coupled to a radially inner surface of inner shell 215. Inner rod end 235 may be configured to radially move a BOAS segment 190 in response to radial movement from outer shell 211 and inner shell 215. For example, and with brief reference to FIGS. 2A and 2B, inner rod end 235 of control rod 230 may be coupled to BOAS mounting block 191. In response to radial movement from actuator 210, control rod 230 may move BOAS mounting block 191 in a radial direction, causing a corresponding movement in the BOAS segment 190. As another example, and with brief reference to FIGS. 3A and 3B, inner rod end 235 of control rod 230 may be coupled to a BOAS segment 190. In response to radial movement from actuator 210, control rod 230 may move the BOAS segment 190 in a radial direction.

In various embodiments, and with reference again to FIGS. 4A and 4B, actuator 210 may also comprise a bias spring 240. Bias spring 240 may be configured to provide bias to actuator 210 to push actuator 210 into a first position (or cold position), as described further herein). Bias spring 240 may be in any suitable position capable of providing bias to actuator 210. For example, as depicted in FIG. 4A and with reference to FIGS. 2A and 2B, bias spring 240 may be located on a radially outer surface of outer shell 211 in contact with a radially inner surface of engine static structure 136. Bias spring 240 may also be located between inner shell 215 and outer shell 211. For example, bias spring 240 may be wrapped around control rod 230 between inner shell 215 and outer shell 211. As another example, as depicted in FIG. 4B and with reference to FIGS. 5A and 5B, bias spring 240 may also be located on a radially outer surface of inner shell 215 in contact with a radially outer surface of turbine case 155. For example, bias spring 240 may be wrapped around control rod 230 between inner shell 215 and turbine case 155. In various embodiments, bias spring 240 may also be located on each of the radially outer surface of inner shell 215 and the radially outer surface of outer shell 211 (e.g., two bias springs 240 in contact with actuator 210).

In various embodiments, and with reference again to FIGS. 2A and 2B, actuation control system 200 may comprise a power supply 205. Power supply 205 may be in electronic communication with control wires 220 and may be configured to provide an electrical current through control wires 220. Power supply 205 may generate any suitable voltage, current, and/or power to control wires 220. For example, in various embodiments, power supply 205 may be expected to generate between five and ten Volts and between one and ten Amperes, direct current (DC).

In various embodiments, power supply 205 may incorporate and/or may be in logical communication with a controller 206 configured to control the output of electrical power from power supply 205. Controller 206 may include logic configured to control output of electrical power, such as, for example, in response to determining a tip clearance actuation event based on engine operational factors such as gas turbine engine 120 temperatures, high pressure turbine section 154 temperature, and/or the like; engine state; and/or state of the aircraft (e.g., during takeoff, cruising altitude, landing, etc.). Controller 206 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, controller 206 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, and with reference again to FIGS. 2A and 2B, an actuation control system 200 having actuators 210 in operable communication with BOAS mounting blocks 191 is depicted. With reference to FIG. 2A, actuators 210 are depicted in a first position (or a cold position). In the first position, tip clearance 201 may comprise a first distance d1. First distance d1 may comprise a radial distance between blade tip 192 and BOAS segment 190. In the first position, first distance d1 may be configured to minimize tip clearance 201 between each BOAS segment 190 and blade tip 192. For example, first distance d1 may comprise about 0.005 inches (0.127 mm) to about 0.01 inches (0.254 mm), about 0.01 inches (0.254 mm) to about 0.015 inches (0.381 mm), about 0.015 inches (0.0381 mm) to about 0.02 inches (0.508 mm), and/or about 0.02 inches (0.508 mm) to about 0.03 inches (0.762 mm) (wherein about in this context refers only to +/−0.005 inches (0.127 mm)).

In various embodiments, and with reference to FIG. 2B, in response to receiving an electrical current from power supply 205, actuators 210 may move into a second position (or a hot position). For example, in response to receiving the electrical current, the SMA wire 225 within each actuator 210 may contract causing actuator 210 to actuate in a radial direction towards engine static structure 136. In response to actuation from actuator 210, control rod 230 may also move in a radial direction towards engine static structure 136, causing each corresponding BOAS mounting 191 to move in the corresponding radial direction towards engine static structure 136. Movement of each BOAS mounting blocks 191 may cause a corresponding radial movement in each BOAS segment 190. In the second position, tip clearance 201 may comprise a second distance d2. Second distance d2 may comprise a radial distance between blade tip 192 and BOAS segment 190. Second distance d2 may be greater than first distance d1. For example, second distance d2 may comprise about 0.03 inches (0.762 mm) to about 0.035 inches (0.889 mm), about 0.035 inches (0.889 mm) to about 0.04 inches (1.016 mm), about 0.04 inches (1.016 mm) to about 0.045 inches (1.143 mm), and/or about 0.045 inches (1.143 mm) to about 0.05 inches (1.27 mm) (wherein about in this context refers only to +/−0.005 inches (0.127 mm)). In that respect, the second distance d2 may be configured to provide tip clearance 201 for blade tip 192 to radially expand (e.g., during a heating cycle).

In response to blade tip 192 radially contracting during a cooling cycle (e.g., an air cooling cycle), power supply 205, via controller 206, may stop providing electrical current to control wires 220, allowing the SMA wires 225 in each actuator 210 to expand. Expansion of the SMA wires 225, together with a force provide by bias spring 240, may allow each actuator 210 to move back into the first position, decreasing tip clearance 201 back to first distance d1.

Figure 3A:
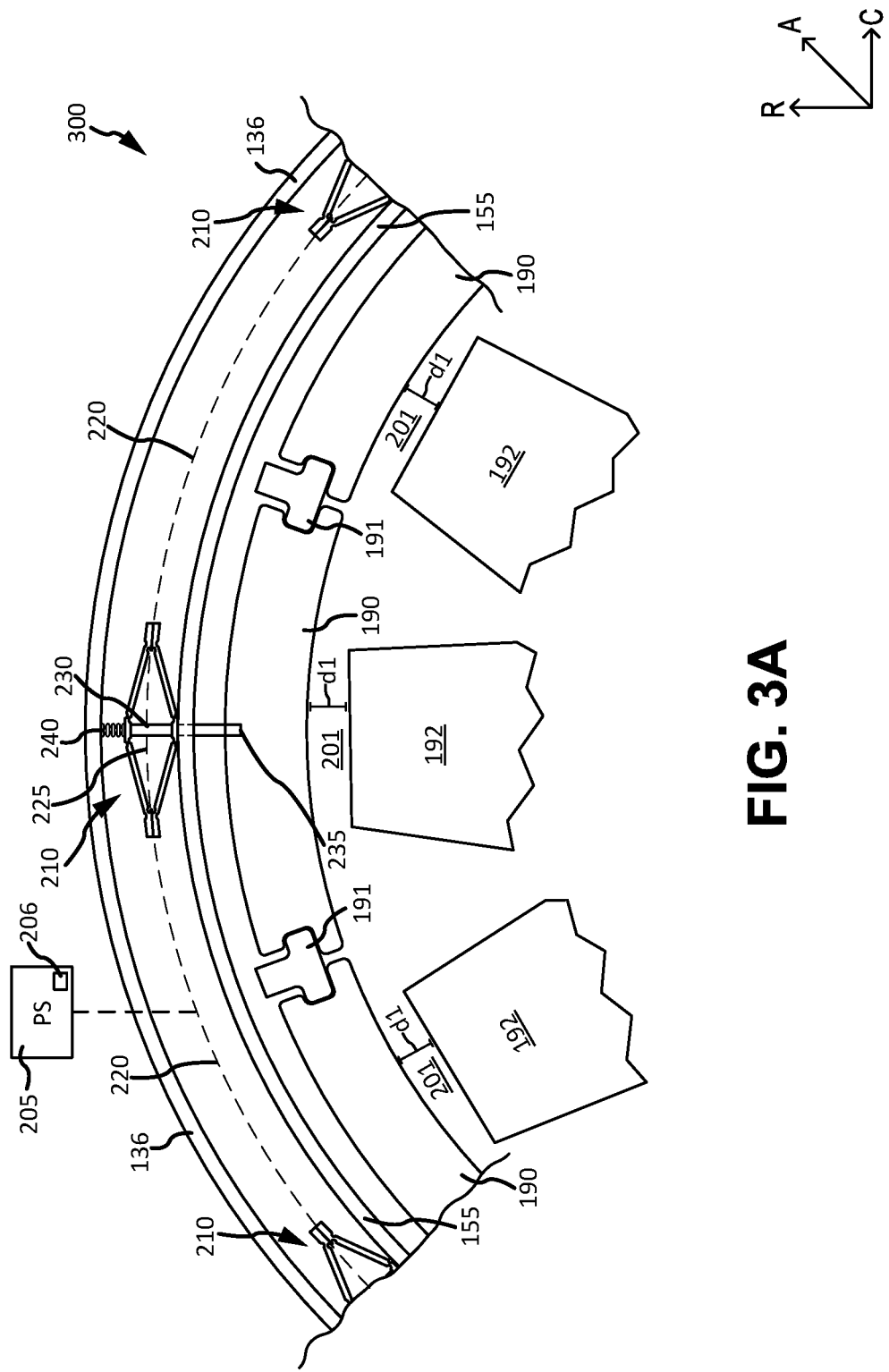
FIG. 3A illustrates a cross-section view of an actuation control system in operable communication with a BOAS segment in a first position, in accordance with various embodiments.

In various embodiments, and with reference again to FIGS. 3A and 3B, an actuation control system 300 having actuators 210 in operable communication directly with each BOAS segment 190 is depicted. With reference to FIG. 3A, actuators 210 are depicted in a first position (or a cold position). In the first position, tip clearance 201 may comprise a first distance d1. First distance d1 may comprise a radial distance between blade tip 192 and BOAS segment 190. In the first position, first distance d1 may be configured to minimize tip clearance 201 between each BOAS segment 190 and blade tip 192. For example, first distance d1 may comprise about 0.005 inches (0.127 mm) to about 0.01 inches (0.254 mm), about 0.01 inches (0.254 mm) to about 0.015 inches (0.381 mm), about 0.015 inches (0.0381 mm) to about 0.02 inches (0.508 mm), and/or about 0.02 inches (0.508 mm) to about 0.03 inches (0.762 mm) (wherein about in this context refers only to +/−0.005 inches (0.127 mm)).

Figure 3B:
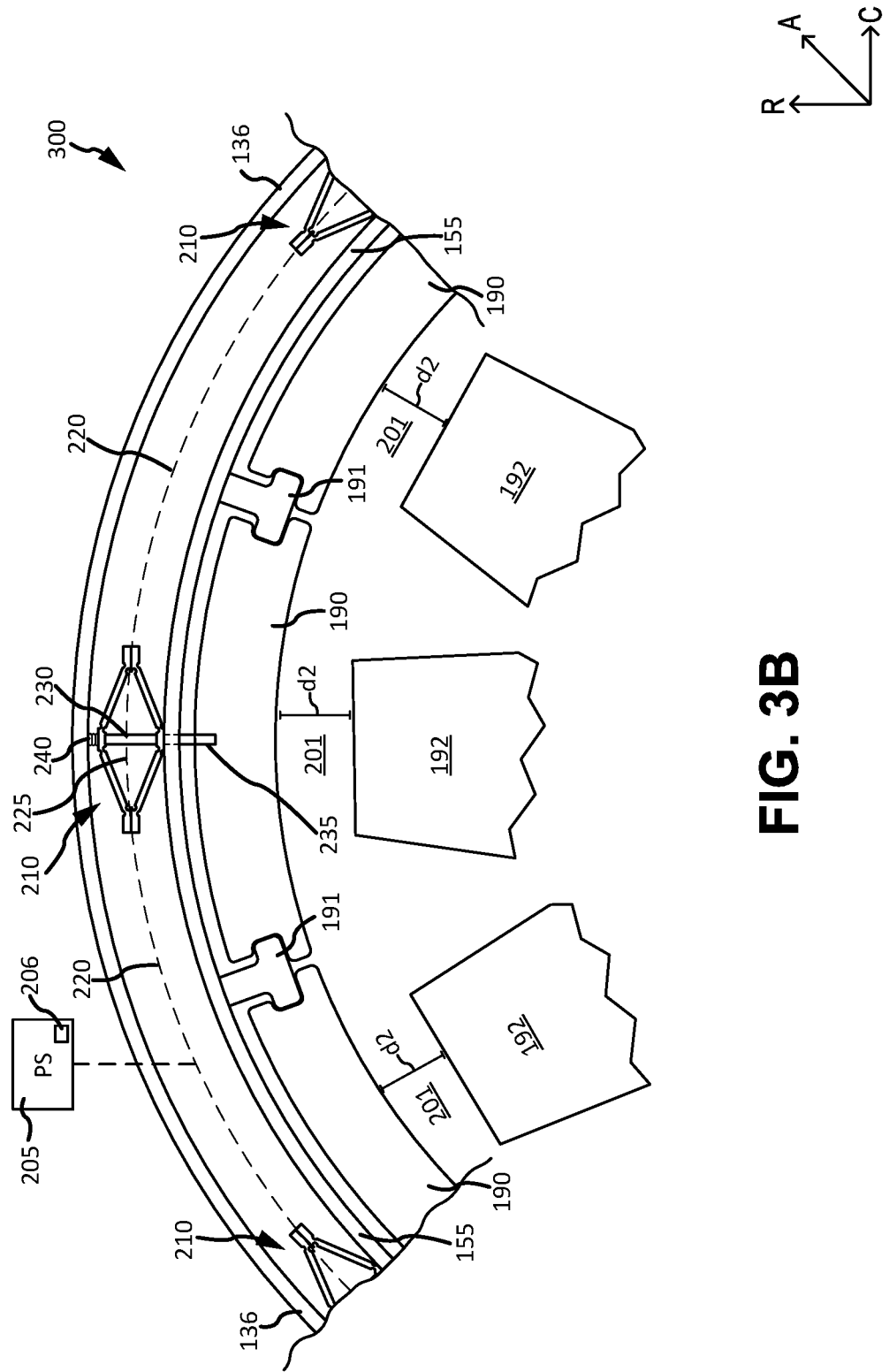
FIG. 3B illustrates a cross-section view of an actuation control system in operable communication with the BOAS segment in a second position, in accordance with various embodiments.

In various embodiments, and with reference to FIG. 3B, in response to receiving an electrical current from power supply 205, actuators 210 may move into a second position (or a hot position). For example, in response to receiving the electrical current, the SMA wire 225 within each actuator 210 may contract causing actuator 210 to actuate in a radial direction towards engine static structure 136. In response to actuation from each actuator 210, control rod 230 may move in a radial direction towards engine static structure 136, causing each corresponding BOAS segment 190 to also move in the radial direction towards engine static structure 136. In the second position, tip clearance 201 may comprise a second distance d2. Second distance d2 may comprise a radial distance between blade tip 192 and BOAS segment 190. Second distance d2 may be greater than first distance d1. For example, second distance d2 may comprise about 0.03 inches (0.762 mm) to about 0.035 inches (0.889 mm), about 0.035 inches (0.889 mm) to about 0.04 inches (1.016 mm), about 0.04 inches (1.016 mm) to about 0.045 inches (1.143 mm), and/or about 0.045 inches (1.143 mm) to about 0.05 inches (1.27 mm) (wherein about in this context refers only to +/−0.005 inches (0.127 mm)). In that respect, the second distance d2 may be configured to provide tip clearance for blade tip 192 to radially expand (e.g., during a heating cycle).

In response to blade tip 192 radially contracting during a cooling cycle (e.g., an air cooling cycle), power supply 205, via controller 206, may stop providing electrical current to control wires 220, allowing the SMA wires 225 in each actuator 210 to expand. Expansion of the SMA wires 225, together with a force provided by bias spring 240, may allow each actuator 210 to move back into the first position, decreasing tip clearance 201 back to first distance d1.

Figure 5A:
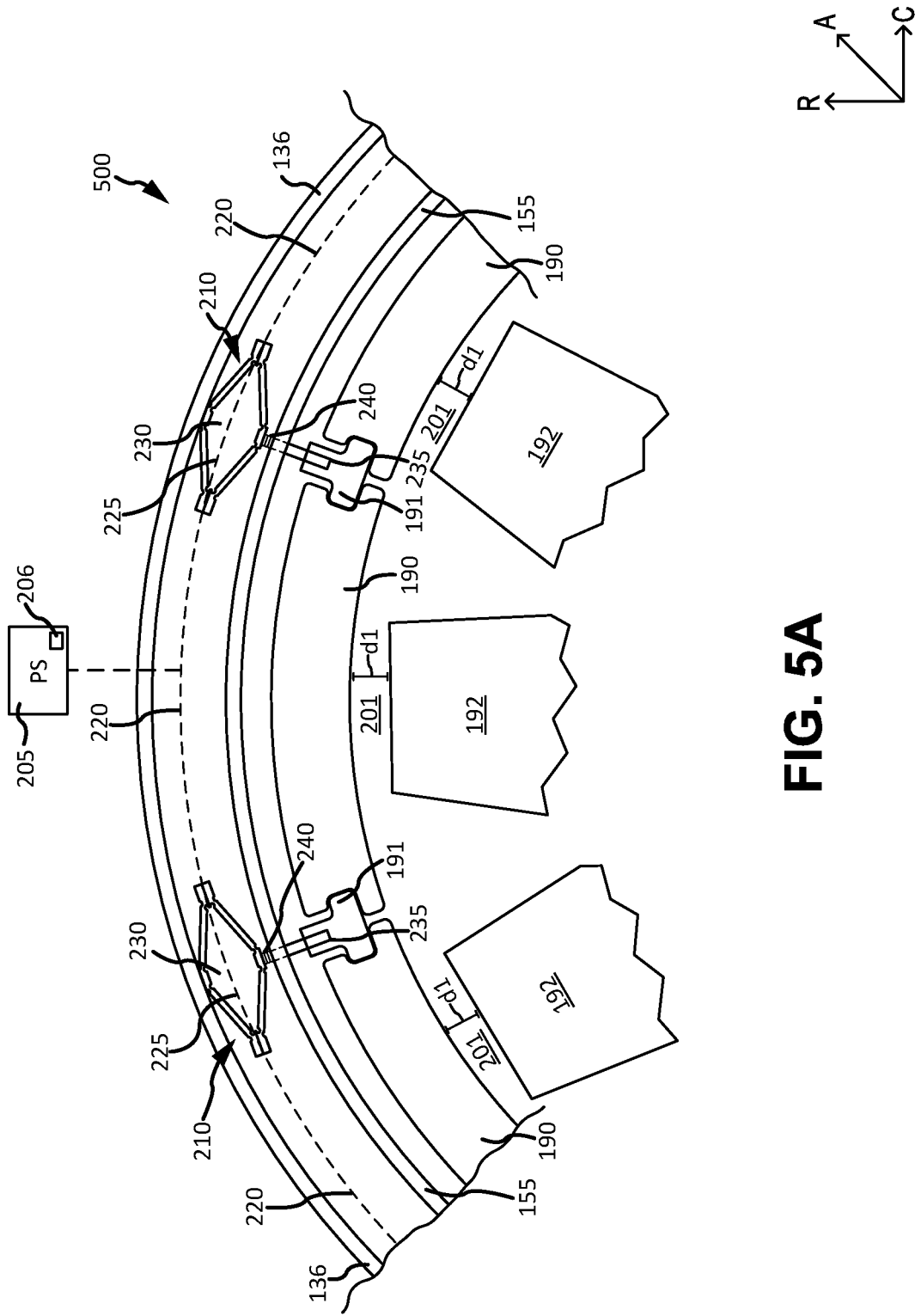
FIG. 5A illustrates a cross-section view of an actuation control system comprising a bias spring between an actuator and a turbine case in a first position, in accordance with various embodiments.

In various embodiments, and with reference again to FIGS. 5A and 5B, an actuation control system 500 comprising a bias spring 240 between each actuator 210 and turbine case 155 is depicted. With reference to FIG. 5A, actuators 210 are depicted in a first position (or a cold position). For example, in response to receiving the electrical current, the SMA wire 225 within each actuator 210 may contract causing actuator 210 to actuate in a radial direction towards turbine case 155. In response to actuation by each actuator 210, control rod 230 may also move in a radial direction towards blade tips 192, causing each corresponding BOAS mounting block 191, and BOAS segment 190, to also move in the radial direction towards blade tips 192. In the first position, tip clearance 201 may comprise a first distance d1. First distance d1 may comprise a radial distance between blade tip 192 and BOAS segment 190. In the first position, first distance d1 may be configured to minimize tip clearance 201 between each BOAS segment 190 and blade tip 192. For example, first distance d1 may comprise about 0.005 inches (0.127 mm) to about 0.01 inches (0.254 mm), about 0.01 inches (0.254 mm) to about 0.015 inches (0.381 mm), about 0.015 inches (0.0381 mm) to about 0.02 inches (0.508 mm), and/or about 0.02 inches (0.508 mm) to about 0.03 inches (0.762 mm) (wherein about in this context refers only to +/−0.005 inches (0.127 mm)).

Figure 5B:
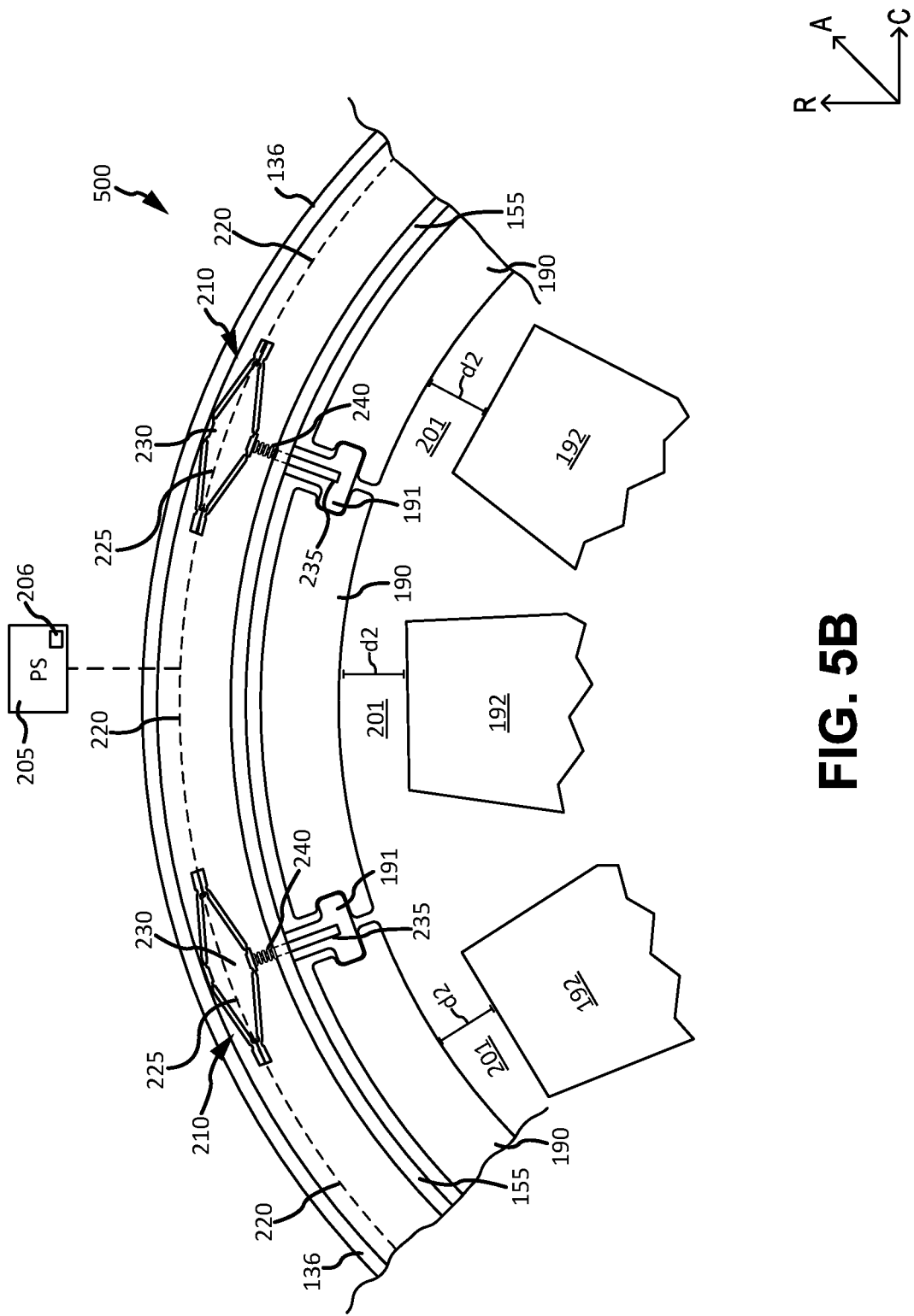
FIG. 5B illustrates a cross-section view of an actuation control system comprising a bias spring between the actuator and the turbine case in a second position, in accordance with various embodiments.

In various embodiments, and with reference to FIG. 5B, in response to power supply 205, via controller 206, stopping the supply of electrical current to control wires 220, actuators 210 may move into a second position (or a hot position). For example, in response to not receiving electrical current, the SMA wires 225 within each actuator 210 may expand, causing each actuator 210 to expand in a circumferential direction. In response to each actuator 210 expanding in the circumferential direction, each BOAS mounting block 191, via the corresponding control rod 230, may move in a radial direction towards turbine case 155. In the second position, tip clearance 201 may comprise a second distance d2. Second distance d2 may comprise a radial distance between blade tip 192 and BOAS segment 190. Second distance d2 may be greater than first distance d1. For example, second distance d2 may comprise about 0.03 inches (0.762 mm) to about 0.035 inches (0.889 mm), about 0.035 inches (0.889 mm) to about 0.04 inches (1.016 mm), about 0.04 inches (1.016 mm) to about 0.045 inches (1.143 mm), and/or about 0.045 inches (1.143 mm) to about 0.05 inches (1.27 mm) (wherein about in this context refers only to +/−0.005 inches (0.127 mm)). In that respect, the second distance d2 may be configured to provide tip clearance for blade tip 192 to radially expand (e.g., during a heating cycle).

In response to blade tips 192 radially contracting during a cooling cycle, power supply 205, via controller 206, may again provide electrical current to control wires 220, contracting the SMA wires 225 in each actuator 210. Contraction of the SMA wires 225 may allow each actuator 210 to actuate back into the first position, decreasing tip clearance 201 back to first distance d1.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An actuation control system, comprising:
   an actuator in operable communication with a blade outer air seal (BOAS) mounting block, the actuator being a flextensional actuator; and
   a BOAS segment coupled to the BOAS mounting block, wherein the BOAS mounting block is configured to move from a first position to a second position in response to an actuation from the actuator.

2. The actuation control system of claim 1, wherein the actuator comprises a control wire configured to control the actuation of the actuator.

3. The actuation control system of claim 2, wherein the control wire comprises a shape memory alloy (SMA) wire configured to contract in response to receiving an electrical current, and wherein the contraction of the SMA wire controls the actuation of the actuator.

4. The actuation control system of claim 3, further comprising a power supply having a controller, wherein the power supply is configured to transmit the electrical current to the control wire in response to the controller determining a tip clearance actuation event.

5. The actuation control system of claim 1, wherein the actuator comprises a control rod coupled at a first rod end to the actuator and at a second rod end to the BOAS mounting block, wherein the control rod is configured to move the BOAS mounting block from the first position to the second position in response to the actuation from the actuator.

6. The actuation control system of claim 1, further comprising at least one of a first bias spring coupled to an outer shell of the actuator or a second bias spring coupled to an inner shell of the actuator.

7. A turbine section of a gas turbine engine, comprising:
a turbine blade having a blade tip;
a blade outer air seal (BOAS); and
an actuation control system comprising an actuator coupled to a radially outer surface of a turbine case and configured to modulate a tip clearance between the blade tip and the BOAS, wherein the actuator is a flextensional actuator.

8. The turbine section of claim 7, wherein the actuator is in operable communication with the BOAS and is configured to move the BOAS from a first position to a second position to modulate the tip clearance, in response to the actuation from the actuator.

9. The turbine section of claim 7, wherein the actuator comprises a control wire configured to control the actuation of the actuator, wherein the control wire comprises a shape memory alloy (SMA) wire configured to contract in response to receiving an electrical current, and wherein the contraction of the SMA wire controls the actuation of the actuator.

10. The turbine section of claim 9, further comprising a power supply having a controller, wherein the power supply is configured to transmit the electrical current to the control wire in response to the controller determining a tip clearance actuation event.

11. The turbine section of claim 7, further comprising a bias spring coupled to at least one of an outer shell of the actuator or an inner shell of the actuator between the inner shell of the actuator and the turbine case.

12. An actuation control system, comprising:
an actuator, wherein the actuator is a flextensional actuator; and
a blade outer air seal (BOAS) segment in operable communication with the actuator, wherein the BOAS segment is configured to move from a first position to a second position in response to an actuation from the actuator.

13. The actuation control system of claim 12, wherein the actuator comprises a control wire having a shape memory alloy (SMA) wire configured to contract in response to receiving an electrical current, wherein the contraction of the SMA wire controls the actuation of the actuator.

14. The actuation control system of claim 13, further comprising a power supply having a controller, wherein the power supply is configured to transmit the electrical current to the control wire in response to the controller determining a tip clearance actuation event.

15. The actuation control system of claim 12, wherein the actuator comprises a control rod coupled at a first rod end to the actuator and at a second rod end to the BOAS segment, wherein the control rod is configured to move the BOAS segment from the first position to the second position in response to the actuation from the actuator.

16. The actuation control system of claim 12, further comprising at least one of a first bias spring coupled to an outer shell of the actuator or a second bias spring coupled to an inner shell of the actuator.

* * * * *